(12) United States Patent
Caron et al.

(10) Patent No.: US 6,968,556 B1
(45) Date of Patent: Nov. 22, 2005

(54) AUTOMATIC MESSAGE-BASED MODULE INVOCATION

(75) Inventors: Ilan Caron, Seattle, WA (US); Raphael Renous, Haifa (IL); Yifat Peled, Haifa (IL); James Simpson, Bonet Bay (AU)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/504,531

(22) Filed: Feb. 15, 2000

(51) Int. Cl.$^7$ ............... G06F 3/00; G06F 9/44; G06F 9/46; G06F 13/00
(52) U.S. Cl. ............... 719/318; 719/314
(58) Field of Search ............... 709/314; 719/310, 719/318, 313–316

(56) References Cited

U.S. PATENT DOCUMENTS

| | | | |
|---|---|---|---|
| 5,630,127 A * | 5/1997 | Moore et al. | 707/103 R |
| 5,799,173 A * | 8/1998 | Gossler et al. | 703/21 |
| 5,802,253 A * | 9/1998 | Gross et al. | 706/47 |
| 5,881,315 A * | 3/1999 | Cohen | 710/52 |
| 5,893,911 A * | 4/1999 | Piskiel et al. | 707/10 |
| 6,046,780 A * | 4/2000 | Tani | 348/722 |
| 6,108,670 A * | 8/2000 | Weida et al. | 707/203 |
| 6,138,168 A * | 10/2000 | Kelly et al. | 719/310 |
| 6,249,807 B1 * | 6/2001 | Shaw et al. | 709/206 |
| 6,282,565 B1 * | 8/2001 | Shaw et al. | 709/206 |
| 6,336,139 B1 * | 1/2002 | Feridun et al. | 709/224 |

OTHER PUBLICATIONS

Gehani et al., "Event Specification in an Active Object-Oriented Database," *ACM SIGMOD*, pp. 81-90 (Jun. 1992).

* cited by examiner

*Primary Examiner*—Meng-Al T. An
*Assistant Examiner*—Diem Cao
(74) *Attorney, Agent, or Firm*—Workman Nydegger (57) ABSTRACT

Automatic message-based module invocation within a transactional message system is described. The modules can be software components, executable program files, etc. In one embodiment, a system includes one or more queues, a trigger store, and a trigger service. Each queue is capable of receiving messages. The trigger store includes one or more triggers, where each trigger is associated with a queue, and has associated therewith one or more rules, where each rule has a condition and an action. The trigger service is designed to, upon receipt of a message in a queue, check the condition of each rule of each trigger associated with the queue, to determine if the message satisfies the rule's condition. If such satisfaction occurs, then the action of the rule is performed, which can include invocation of a module. The rules may be short-circuit rules, non-destructive rules, and/or destructive rules, and may be checked in either a concurrent or serial manner.

41 Claims, 5 Drawing Sheets

AUTOMATIC MESSAGE-BASED MODULE INVOCATION

FIELD OF THE INVENTION

This invention relates generally to transactional message systems, and more particularly to the invocation of modules such as software components and executable program files triggered by messages within such systems.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A transaction is an activity or a request, such as an order, a purchase, a change, or an addition to a database of information. Transactions usually update one or more files on a non-volatile storage such as a hard disk drive, and thus can serve as both an audit trail and a history for future analyses. A transaction can include one or more messages. A transaction is considered committed when all the messages of the transaction have been received and processed.

Frequently, messages are desired to be used to trigger specific functionality, which can be found in modules, which include but are not limited to software components, such as ActiveX components, Java Beans, Component Object Model (COM) components, etc., as known within the art, as well as executable program files—program files ending in .exe, for example. Within the prior art, for messages to trigger a module, an application has to be developed that opens a message queue in which messages are received, process the messages to check for messages that are desired to trigger the module, and then trigger the module if such messages are found, and dispatch the messages as necessary. However, this is disadvantageous, because to add new functionality triggering, new applications have to be developed, or existing applications have to be redeveloped. This can be expensive, from a time and cost perspective. For this and other reasons, therefore, there is a need for the present invention.

SUMMARY OF THE INVENTION

The present invention relates to automatically invoking modules, such as software components and program executable files, based on messages. In one embodiment, a transactional message system includes one or more queues, a trigger store, and a trigger service. Each queue is capable of receiving messages. The trigger store includes one or more triggers, where each trigger is associated with a queue, and has associated therewith one or more rules, where each rule has a condition and an action. The trigger service is designed to, upon receipt of a message in a queue, check the condition of each rule of each trigger associated with the queue, to determine if the message satisfies the rule's condition. If such satisfaction occurs, then the action of the rule is performed, which can include invocation of a module.

Embodiments of the invention provide for advantages not found within the prior art. For example, rather than forcing development or redevelopment of applications that process messages to invoke modules, embodiments of the invention allow for the writing of rules, and the grouping of the rules in triggers, such that no coding is required. Thus, embodiments of the invention can be said to provide for an end-to-end solution where no coding has to occur. In one embodiment, the system can also include a trigger manager that is designed to provide for creating, editing, and deleting triggers in a visual, non-programming manner, further easing the ability to automatically invoke modules based on messages.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
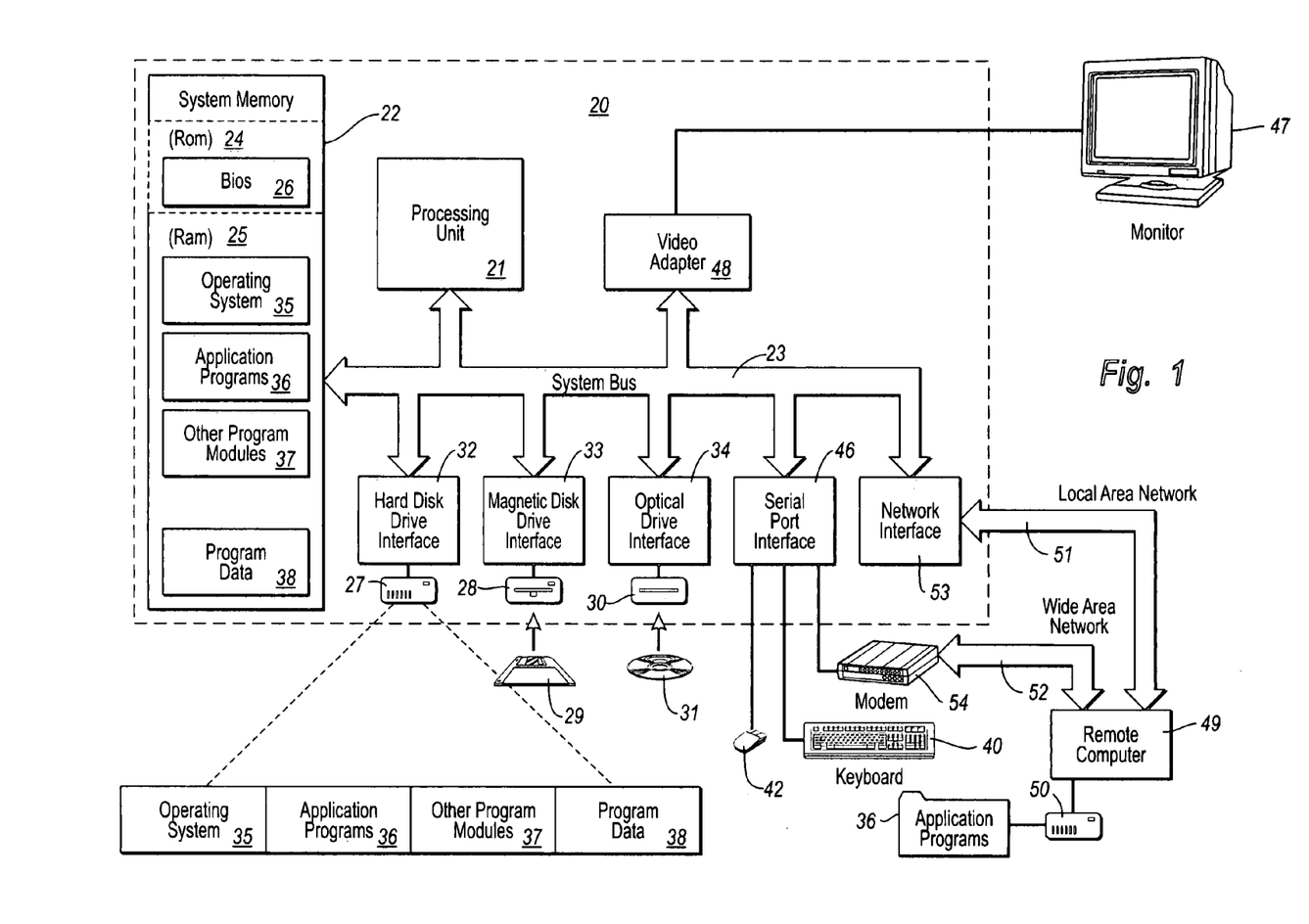
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview of a Transactional Message System

Figure 2:
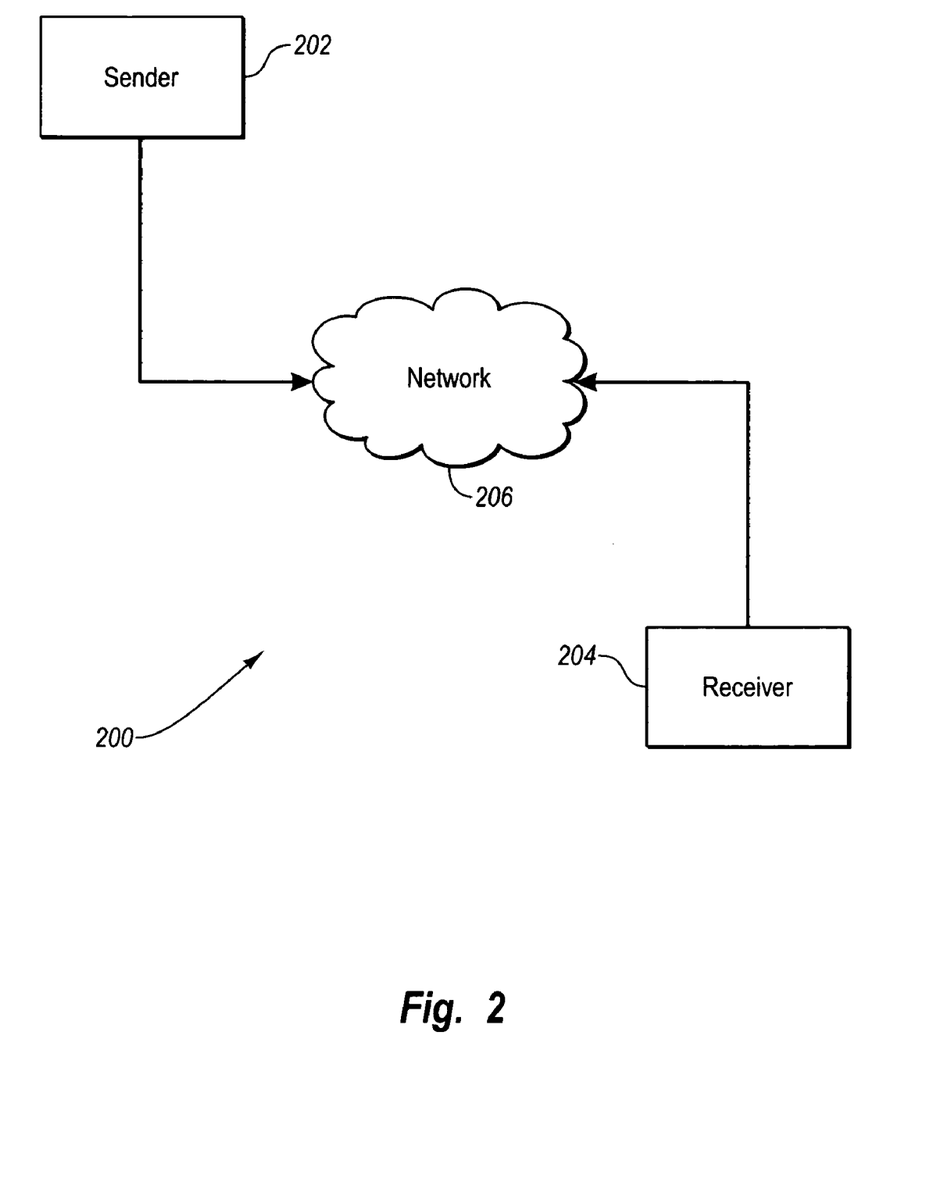
FIG. 2 is a diagram showing an overview of a transactional message system in conjunction with which embodiments of the invention can be practiced.

A simplified overview of a representative transactional message system in conjunction with which embodiments of the invention can be practiced is described in this section of the detailed description, in conjunction with the diagram of FIG. 2, which is a diagram of such a representative system. The system 200 of FIG. 2 includes a sender 202, a receiver 204, and a network 206. Each of the sender and the receiver 204 can in one embodiment be a computer, such as that which has been described in the previous section of the detailed description, in conjunction with FIG. 1, although the invention is not so limited. The network 206 can be a public network, such as the Internet, or a private network, such as an intranet or a wide-area network (WAN), or a combination public-private network, such as the public Internet connected to an intranet or an extranet. The invention is not so particularly limited.

A local transaction is performed on the sender 202, such that all the messages of the transaction are committed to a local messaging system, or none at all. The local messaging system (not shown in FIG. 2), then delivers the messages making up the transaction over the network 206. If any failures occur during this network phase, then the sender 202 is notified, and the sender 202 takes appropriate corrective action. Similarly, a local transaction is on the receiver 204, such that all the messages of the transaction are committed, or none are. It is noted that if the transaction fails on the receiver 204, then the receiver 204 notifies the sender 202 to appropriately recover. Embodiments of the invention are concerned with actions that take place as a result of the receiver 204 receiving predetermined messages, such as messages from a particular sender, relating to a particular subject matter, etc.; the invention is not so limited. This is described in the next section of the detailed description.

Transactional Message System According to an Embodiment of the Invention

Figure 3:
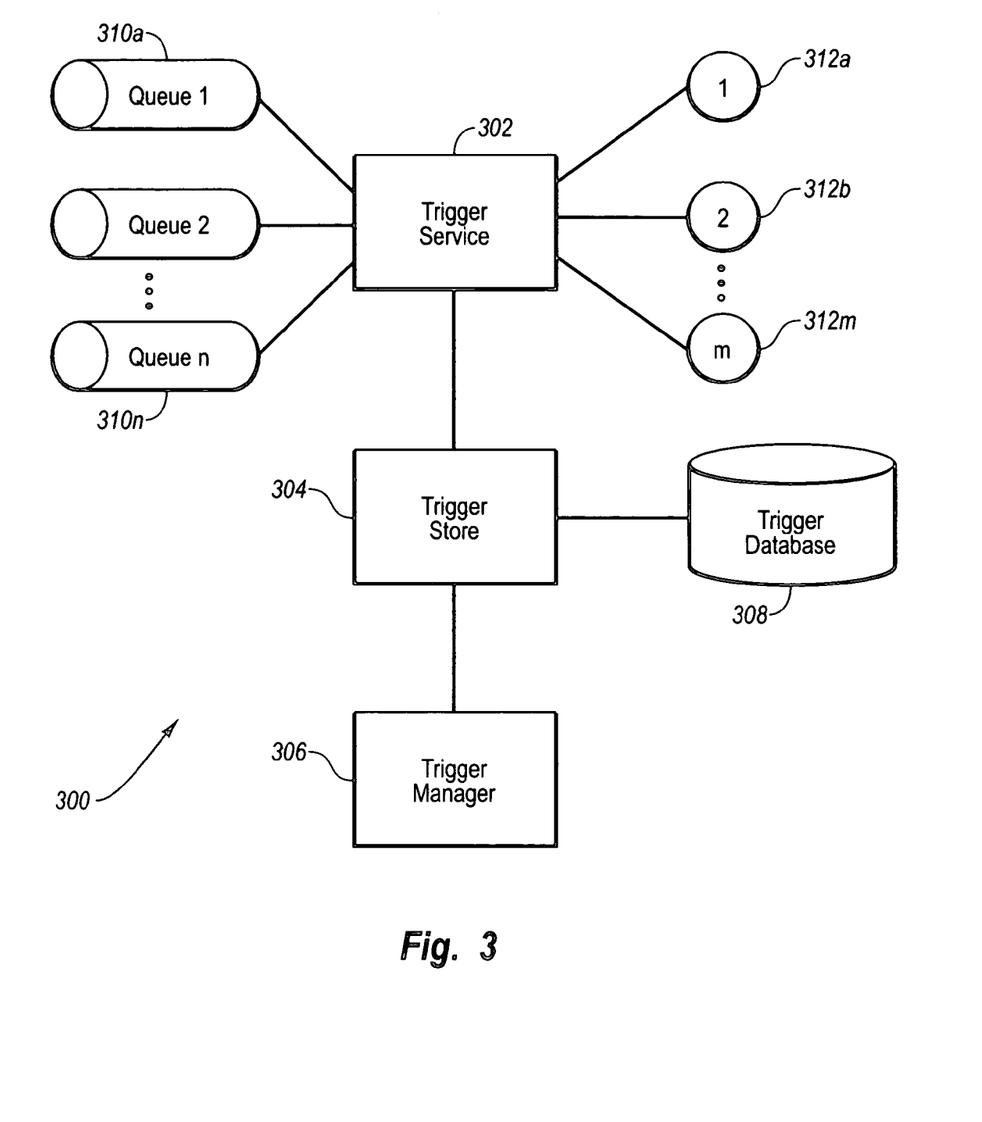
FIG. 3 is a diagram of a transactional message system according to an embodiment of the invention.

In this section of the detailed description, a transactional message system according to an embodiment of the invention, that provides for automatic invocation of modules, is described, in conjunction with FIG. 3, which is a diagram of such a system. The system 300 of FIG. 3 in one embodiment can correspond to the receiver 204 of FIG. 3 that has been described (e.g., a computer), although the invention itself is not so limited. The system 300 includes a trigger service 302, a trigger store 304, a trigger manager 306, a trigger database 308, message queues 310a, 310b. 310n, and modules 312a, 312b . . . 312n. It is noted that the invention itself is not limited to a system in which each of the parts of the system 300 as shown in FIG. 3 are present. As a non-limiting example, the trigger manager 306 and/or the trigger database 308 may not be present in a particular embodiment.

Each of the message queues 310 is capable of receiving messages that are part of transactions. The trigger store 304 includes one or more triggers, where each trigger is associated with a queue. Each trigger has associated therewith one or more rules. The trigger store 304 can itself correspond to a particular computer, such that each computer has its own trigger store 304, such that the triggers of the store 304 are references, or pointers, to actual triggers stored in the trigger database 308, which may be global to more than one computer. However, the invention is not limited to such a system architecture, as can be appreciated by those of ordinary skill within the art. Both the trigger store 304 and the trigger database 308 can in one embodiment include data representing triggers, pointers thereto, etc., as stored on a computer-readable medium, such as a hard disk drive, memory, etc. Likewise, each of the messages queues 310 can in one embodiment include data representing messages, as stored on a computer-readable medium.

The trigger service 302 is designed to, upon receipt of a message in one of the queues 310, examine, or check, each rule of each trigger associated with the queue in which the message has been received, to determine if the message satisfies the rule. A rule satisfied by the message may then invoke a module. As shown in FIG. 3, there are modules 312a, 312b . . . 312m. Each module 312 can be a software component, an executable program file, etc.; the invention is not so limited. Thus, as messages arrive in the queues 310, the trigger service 302 examines the rules associated with the queues, and if they are satisfied, can trigger one or more of the modules 312 associated with the rules. In one embodiment, the trigger service 302 includes a computer program, executed by a processor from a computer-readable medium. In one embodiment, the message itself, or one or more parts thereof, may be passed by the trigger service 302 to the module executed—for example, this is useful where the module is operable on data such as that found within the message. Furthermore, in one embodiment, the trigger service 302 can correspond to a means for checking the condition of each rule for satisfaction by a message, and performing the action of the rule upon satisfaction thereof.

The trigger manager 306 is designed to provide for creating, editing, and deleting triggers in a visual, non-programming manner. For example, new triggers associated with particular queues can be created, and new rules within those triggers can be created. Triggers and rules can also be modified (edited) and deleted. Desirably, this is accomplished within a graphical user interface, such that a user, for example, can accomplish the creating, editing and deleting via standard point, click and drag functionality as known within the art. Such a graphical user interface thus provides for a non-programming manner by which to create, edit and delete triggers. In one embodiment, the trigger manager 306 can correspond to a means for creating, editing and deleting triggers in a visual, non-programming manner.

It is noted that embodiments of the invention are not limited to the manipulation of triggers in a non-programming manner. For example, other triggers can be utilized that are manipulated in a programming manner. Such triggers, for example, can be specified via a script, in accordance with a scripting language, such that they are manipulated in a non-visual, programming manner, as can be appreciated by those of ordinary skill within the art.

It is noted that the description provided in this section of the detailed description discusses triggers and rules in a general way. In the next section of the detailed description, therefore, triggers and rules according to embodiments of the invention are described more particularly. Such triggers and rules can be utilized in conjunction with the system as described in conjunction with FIG. 3. Furthermore, in another succeeding section of the detailed description, methods according to embodiments of the invention are described. Such methods are amenable to performance by the system as described in conjunction with FIG. 3 as well.

Triggers and Rules

In this section of the detailed description, triggers and rules, in conjunction with which embodiments of the invention, such as the system described in the preceding section, can be utilized, are described in more detail. The description is made with reference to FIG. 4, which is a diagram showing a trigger, a rule, and a queue according to an embodiment of the invention. The diagram of FIG. 4 includes a trigger 400. The trigger 400 is associated with a particular queue 404, and has associated therewith one or more rules, such as the rule 402.

Figure 4:
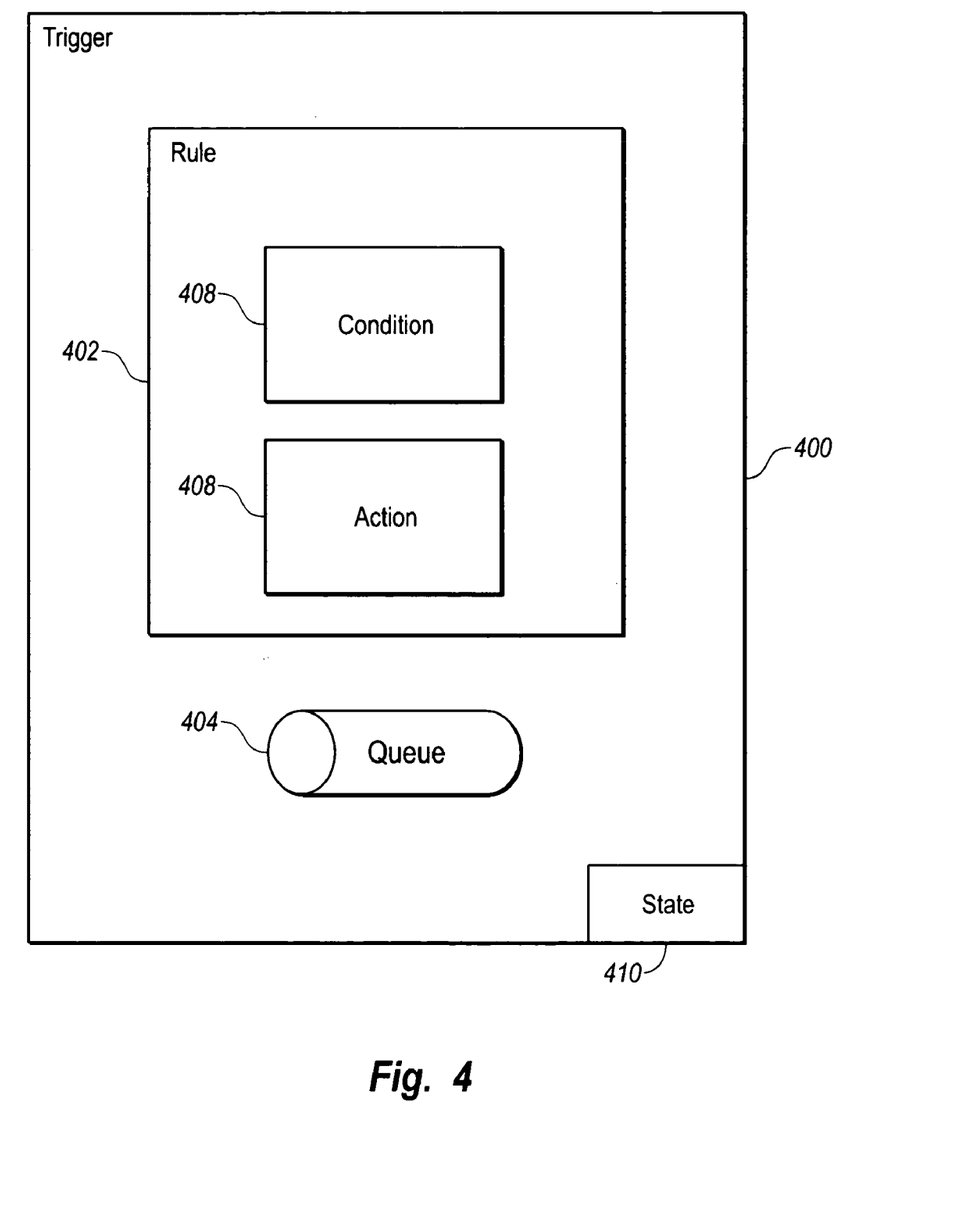
FIG. 4 is a diagram showing the relationship of triggers, rules and queues, in accordance with an embodiment of the invention; and, FIG. 5 is a flowchart of a method according to an embodiment of the invention.

The rule 402 has two parts: a condition 406, and an action 408. The condition 406 of the rule 402 is that part against which incoming messages in the queue 404 are checked for satisfaction. For example, the condition 406 of the rule 402 may specify a particular type of message, a particular sender of the message, particular data contained within the message, etc.; the invention is not so limited. The action 408 of the rule 402 is that part which is performed upon satisfaction of the condition 406. For example, the action 408 can be the invocation of a particular module or modules, such as software components and executable program files, as has been described.

As also shown in FIG. 4, the trigger 400 can include a state 410. In one embodiment, the state 410 is selectable and switchable from an enabled state and a disabled state. When the trigger 400 is in the enabled state, this means that the rules associated therewith have their conditions checked for satisfaction against incoming messages in the queue 404. When the trigger 400 is in the disabled state, this means that the rules associated therewith do not have their conditions checked for satisfaction against incoming message in the queue 404. In effect, the state 410 determines whether the trigger 400 is "on" or "off".

In one embodiment, as has been described, there is more than one trigger associated with a queue. In such an embodiment, the triggers may be ordered, such that the rules thereof have their conditions checked against the incoming messages in the queue in that order. Furthermore, in one embodiment, the rules within a particular trigger may be ordered, such that they have their conditions checked against the incoming messages in the queue in that order. Such checking, therefore, is performed in a serial manner. In another embodiment, however, the rules and/or the triggers are unordered, such that the checking of the rules against the incoming messages in the queue is performed in a concurrent manner in a multi-processor and/or multi-threaded operating environment, as known within the art, which lends for increased scalability, as can be appreciated by those of ordinary skill within the art.

Furthermore, in one embodiment, a rule such as the rule 402 of the trigger 400 can be specified as a short-circuit rule. A short-circuit rule is one such that satisfaction of the condition thereof by a message receiving in the queue causes the checking of the satisfaction of the conditions of other rules in that and other triggers to stop. That is, the short-circuit rule "short circuits" the process of checking rules for satisfaction by the message. It is noted that a short-circuit rule only short circuits the checking of those rules that have not been checked yet. Therefore, the use of short-circuit rules is most desirable in an ordered rule and/or an ordered trigger environment.

It is also noted that in one embodiment, a rule can be either destructive or non-destructive. A non-destructive rule, if satisfied by a particular message in the queue, does not cause removal of the message from the queue, such that other rules can be checked against the same message for satisfaction thereof. Conversely, a destructive rule, if satisfied by a particular message in the queue, causes the removal of the message from the queue. This effectively means that other rules that have not yet been checked cannot be checked against this message for satisfaction thereof. In one embodiment, by default, a rule is non-destructive unless otherwise specified.

Methods

In this section, methods of varying embodiments of the invention are described. Such methods can be performed by and in conjunction with systems and computer as described in preceding sections of the detailed description, and can also utilize triggers and rules as described in the preceding section of the detailed description. However, the invention is not so limited. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 5:
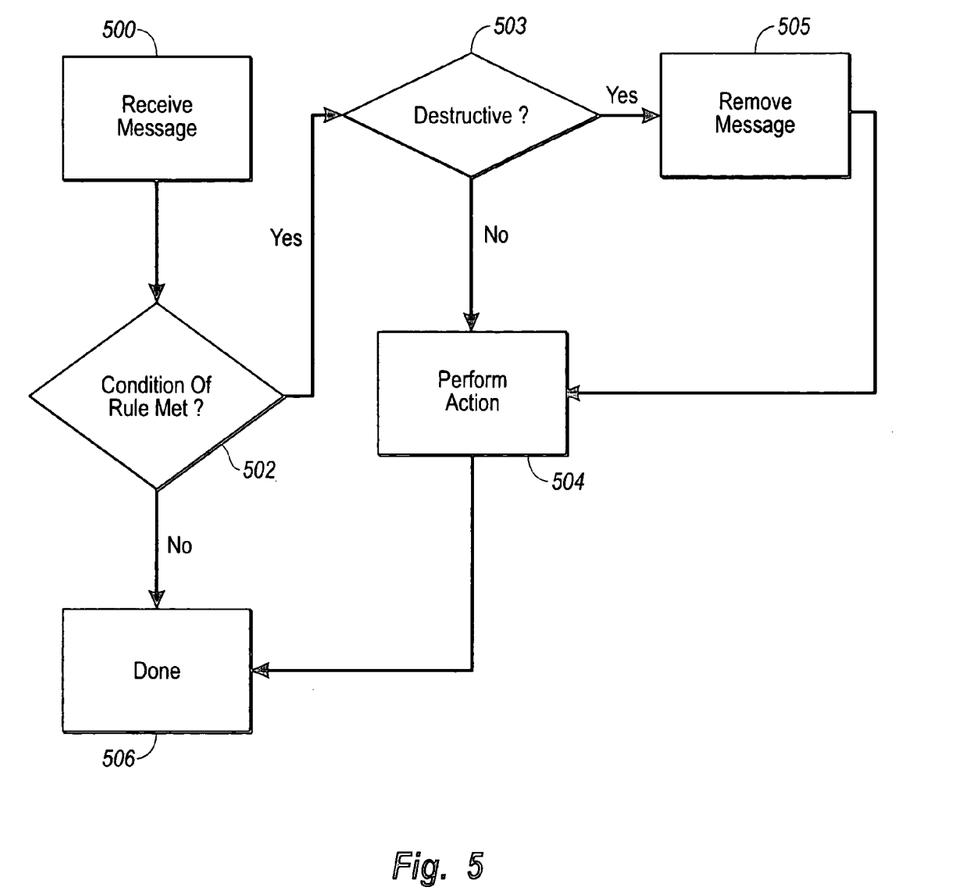

Referring to FIG. 5, a flowchart of a method according to an embodiment is shown. In 500, a message is received in a queue, and is inspected. In 502, for each of one or more triggers associated with the queue, each of one or more rules associated with the trigger is checked for satisfaction by the message. Specifically, the condition of each rule is checked for satisfaction by the message. If, for a particular rule, its condition is satisfied, then the method proceeds to 503. If the rule is destructive, as has been described, then the method proceeds from 503 to 505, where the message is removed from the queue, and the method proceeds thereafter to 504. Otherwise, the message is maintained in the queue, and the method proceeds directly to 504 from 503. In 504, the action associated with the rule having its condition satisfied is performed, such as activating modules associated therewith, as has been described in specific detail in previous sections of the detailed description. If, for a particular rule, its condition is not satisfied, then the method proceeds to 506, where the method is finished as to that rule. As described in the previous section of the detailed description, the rules may be checked in a serial or a concurrent manner, may be destructive or non-destructive, may be short-circuit rules, etc.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A machine-readable medium having instructions stored thereon for execution by a processor to perform a method comprising:

receiving a message in a queue that is associated with a plurality of triggers having a trigger ordering, each trigger comprising one or more rules and grouping the one or more rules such that any rule ordering of the one or more rules is independent of the trigger ordering, each trigger further comprising an enabled state and a disabled state, each rule specifying a condition and an action, where the action specified by each rule is variable from rule to rule;

for each trigger associated with the queue, in the order of the trigger ordering of the plurality of triggers, checking whether the condition specified by each of the one or more rules of and grouped by the trigger is satisfied by the message only when the trigger is in the enabled state; and, upon determining that the condition of the rule is satisfied by the message, performing the action specified by the rule.

2. The medium of claim 1, wherein performing the action specified by the rule comprises activating each of at least one module referenced by the rule.

3. The medium of claim 2, wherein each module comprises one of: a software component; and, an executable program file.

4. The medium of claim 2, wherein activating each of at least one module referenced by the rule comprises passing the message to the module.

5. The medium of claim 1, wherein the at least one rule comprises a short-circuit rule, such that satisfaction by the message received in the queue of the condition specified by the rule causes checking for satisfaction of the condition of any non-checked rules of the at least one rule grouped by the trigger associated with the queue to stop.

6. The medium of claim 1, wherein the at least one rule comprises a destructive rule, such that satisfaction by the message received in the queue of the condition specified by the rule removes the message from the queue.

7. The medium of claim 1, wherein checking is performed in a serial manner.

8. The medium of claim 1, wherein checking is performed in a concurrent manner.

9. A transactional message system comprising:

at least one queue, each queue capable of receiving a plurality of messages;

a trigger store comprising a plurality of ordered triggers, each trigger associated with a queue, having a switchable enabled/disabled state switched to one of an enabled state and a disabled state, and each trigger grouping a plurality of rules in the trigger, each rule, at least, specifying a condition and specifying an action, and the action specified by each rule is capable of being different for each rule; and, a trigger service configured to, at least, upon receipt of a message in a queue, for each trigger associated with the queue, if the switchable enabled/disabled state of the trigger is in the enabled state, check the condition specified by each rule grouped by the trigger for satisfaction by the message, such that the action specified by the rule is performed upon satisfaction by the message of the condition specified by the rule.

10. The system of claim 9, wherein the trigger store corresponds to a particular computer and references each of the at least one trigger within a trigger database.

11. The system of claim 9, wherein each of the at least one queue comprises data stored on a computer-readable medium.

12. The system of claim 9, wherein each of the at least one trigger store comprises data stored on a computer-readable medium.

13. The system of claim 9, wherein the trigger service comprises a computer program executed by a processor from a computer-readable medium.

14. The system of claim 9, further comprising a trigger manager configured to, at least, provide for creating, editing and deleting triggers and rules grouped in triggers in a visual, non-programming manner.

15. The system of claim 9, wherein the trigger service is further configured to, at least, perform the action specified by the rule by activating each of at least one module referenced by the rule.

16. The system of claim 15, further comprising at least one module, such that the at least one module referenced by the rule as activated by the trigger service are selected from the at least one module.

17. The system of claim 16, wherein each module comprises one of: a software component, and an executable program file.

18. The system of claim 16, wherein the trigger service is further configured to, at least, activate each of the at least one module referenced by the rule such that the message is passed to the module.

19. The system of claim 9, wherein the at least one rule comprises a short circuit rule, such that satisfaction by the message received in the queue of the condition specified by the rule causes the trigger service to stop checking for satisfaction of the condition specified by each of any non-checked rules of the at least one rule grouped by the trigger associated with the queue.

20. The system of claim 9, wherein the at least one rule comprises a destructive rule, such that satisfaction by the message received in the queue of the condition specified by the rule removes the message from the queue.

21. The system of claim 9, wherein checking is performed in a serial manner.

22. The system of claim 9, wherein checking is performed in a concurrent manner.

23. The system of claim 9, wherein the system comprises at least one computer.

24. A computer for inclusion into a transactional message system comprising:

at least one queue, each queue capable of receiving a plurality of messages; a trigger store of at least one trigger, each trigger comprising an enabled state and a disabled state, each trigger further being associated with a queue and each trigger grouping at least one rule in the trigger, each rule, at least, specifying a condition and specifying an action, and the action specified by each rule is capable of being different for each rule;

a trigger manager configured to, at least, provide for creating, editing and deleting of triggers and rules grouped in triggers in a visual, non-programming manner; and, means for, upon receipt of a message in a queue, for each trigger associated with the queue, checking the condition specified by each rule grouped by the trigger for satisfaction by the message only when the trigger is in the enabled state, and performing the action specified by the rule upon satisfaction by the message of the condition specified by the rule.

25. The computer of claim 24, wherein the trigger store references each of the at least one trigger within a trigger database.

26. The computer of claim 24, wherein the trigger store of the at least one trigger comprises a trigger store of a plurality of ordered triggers.

27. The computer of claim 24, wherein the means for checking and performing is further for performing the action specified by the at least one rule by activating each of at least one module referenced by the at least one nile.

28. The computer of claim 27, further comprising at least one module, such that the at least one module referenced by the at least one rule are selected from the at least one module.

29. The computer of claim 27, wherein each module comprises one of: a software component, and an executable program file.

30. The computer of claim 27, wherein the means for checking and performing is further for activating each of the at least one module referenced by the at least one rule such that the message is passed to the module.

31. The computer of claim 24, wherein the at least one rule comprises a short circuit rule, such that satisfaction by the message received in the queue of the condition specified by the rule causes the means for checking and performing to stop checking for satisfaction of the condition specified by each of any non-checked rules of the at least one rule grouped by the trigger associated with the queue.

32. The computer of claim 24, wherein the at least one rule comprises a destructive rule, such that satisfaction by the message received in the queue of the condition specified by the rule removes the message from the queue.

33. The computer of claim 24, wherein checking is performed in a serial manner.

34. The computer of claim 24, wherein checking is performed in a concurrent manner.

35. A computer-implemented method performable within a transactional message system comprising:
  receiving a transactional message in a queue associated with a plurality of triggers having a trigger order, each trigger comprising a switchable enabled/disabled state and a set of rules and grouping the set of rules such that any ordering of the set of rules is independent of the trigger order, the set of rules comprising a set of checked rules having a rule order independent of non-checked rules, and each rule specifying a condition and an action, where the action specified by each rule is variable from rule to rule, and wherein the set of rules grouped by the trigger is checked for satisfaction only if the switchable enabled/disabled state of the trigger is in an enabled state; and
  for each trigger associated with the queue, in the trigger order of the plurality of triggers, and for each checked rule of the trigger in the rule order of the set of checked rules grouped by the trigger:
    (a) checking if the message satisfies the condition specified by the checked rule; and
    (b) if the message does satisfy the condition specified by the checked rule then performing the action specified by the checked rule.

36. The method of claim 35, wherein the action specified by the checked rule comprises at least one reference to a module, and wherein performing the action specified by the checked rule comprises activating each of the at least one module referenced by the action specified by the checked rule.

37. The method of claim 36, wherein each referenced module comprises one of: a software component; and, an executable program file.

38. The method of claim 36, wherein activating each of the at least one module referenced by the action of the checked rule comprises passing the message to each referenced module.

39. The method of claim 35, wherein at least one of the set of rules grouped by the at least one trigger comprises a short circuit rule, and the action specified by the short circuit rule comprises stopping the checking of each non-checked rule of the at least one of the set of rules grouped by the at least one trigger.

40. The method of claim 35, wherein at least one of the ordered set of checked rules grouped by the at least one trigger comprises a short circuit rule, and the action specified by the short circuit rule comprises stopping the checking of any rules in the at least one of the ordered set of checked rules subsequent in the order to the short circuit rule.

41. The method of claim 35, wherein the ordered set of checked rules grouped by the trigger comprises a destructive rule, and the action specified by the destructive rule comprises removing the message from the queue.

\* \* \* \* \*

UNITED STATES PATENT AND TRADEMARK OFFICE
CERTIFICATE OF CORRECTION

PATENT NO. : 6,968,556 B1 Page 1 of 1
DATED : November 22, 2005
INVENTOR(S) : Caron et al.

It is certified that error appears in the above-identified patent and that said Letters Patent is hereby corrected as shown below:

Column 10,
Line 63, delete "nile" and insert -- rule --.

Signed and Sealed this

Twenty-eighth Day of March, 2006

JON W. DUDAS
*Director of the United States Patent and Trademark Office*